United States Patent Office 3,203,511
Patented Aug. 31, 1965

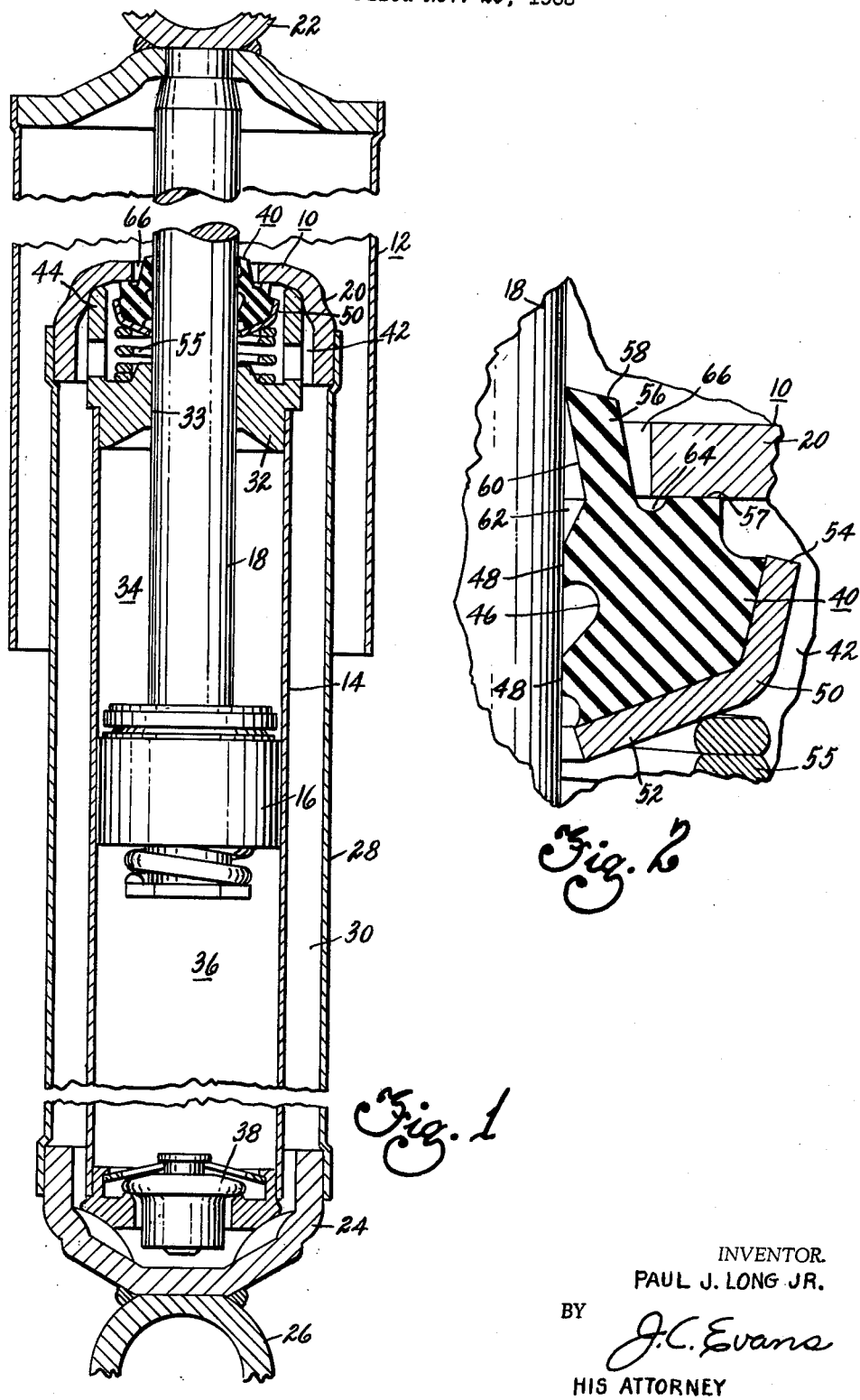

3,203,511
ROD SEAL FOR SHOCK ABSORBER
Paul J. Long, Jr., Dayton, Ohio, assignor to General
Motors Corporation, Detroit, Mich., a corporation of
Delaware
Filed Nov. 29, 1963, Ser. No. 326,712
5 Claims. (Cl. 188—100)

This invention relates to seals for preventing axial leakage along reciprocating rods and more particularly to an improved encircling seal structure for association with the reciprocal piston rod in a vertically arranged, direct-acting shock absorber or the like.

One problem in direct-acting shock absorber units or the like having substantially vertically arranged reciprocal piston rod elements has been that of extending the life of the shock absorber to meet extended present-day automobile warranty periods without materially increasing the production costs of the shock absorber. It is, accordingly, an object of the present invention to improve the life of shock absorber by the provision of an economical rod seal structure therein including novel means to reduce seal friction and wear.

It is a further object of the present invention to provide an improved rod seal structure including the provision of a floating spring biased seal element support that is constructed and arranged to allow substantially unrestricted transverse movement of an encircling rod seal with respect to a reciprocating rod for maintaining concentricity between seal and rod to thereby improve sealing effectiveness.

Yet another object of the invention is to improve shock absorber life by means including an encircling rod seal structure arranged to eliminate trapped water or the like in the vicinity of exposed portions of a vertically reciprocating piston rod element and to eliminate such trapped water or the like by means serving the dual function of wiping the exterior of the vertically reciprocated rod clean upon movement of the rod inwardly of the fluid containing chamber while diverting water and the like from the vicinity of the reciprocable rod during other phases of shock absorber operation.

Further objects and advantages of the present invention will be apparent from the following description, reference being had to the accompanying drawings wherein preferred embodiments of the present invention are clearly shown.

In the drawings:
FIGURE 1 is a cross-sectional view of a shock absorber including the seal of the present invention; and
FIGURE 2 is an enlarged cross-sectional view of the improved seal.

One embodiment of the present invention is shown in the drawing as an encircling rod seal structure 10 associated with a direct-acting shock absorber 12 having a fluid containing cylinder portion 14 slidably supporting a reciprocating piston 16 carried on the end of a vertically reciprocable piston rod 18 having one end thereof extending exteriorly through an upper seal cap 20.

The rod 18 is connected at the exterior end thereof to suitable means, for example, a mounting ring 22 which is adapted to be secured to a sprung portion of a motor vehicle or the like. A lower seal cap 24 supports a mounting ring 26 adapted to be secured to the unsprung mass of a vehicle or the like, for example, the axle housing thereof carried with respect to a roadway or the like by ground engaging wheels.

The end seal caps 20, 24 are connected on either end of a cylinder 28 that surrounds the piston cylinder 14 to form a fluid reservoir chamber 30 therebetween.

At the upper end of the piston cylinder 14 a closure wall 32 is supported having an opening therethrough forming a bearing surface and guide 33 for the vertically reciprocable rod 18 with the closure wall 32 serving to close the upper end of the cylinder 14 to form an upper fluid chamber 34 therein. The piston 16 within the cylinder 14 cooperates therewith to form a lower compression chamber 36 which is fluidly communicated with chamber 34 through valving (not shown) in piston 16 and through a base valve assembly 38 with the fluid reservoir 30 to produce desired rebound and compression damping effects as are produced during the operation of any conventional, direct-acting shock absorber.

A rod encircling seal element 40 of the improved seal structure is disposed within a seal chamber 42 formed by the axially upwardly extending outer wall 44 of the piston rod guide member 32 in cooperation with the upper seal cap 20. The encircling seal element 40 has a plurality of alternate grooves 46 and rod gripping land portions 48 formed on the annular surface of an opening therethrough that act to seal against fluid leakage axially along the outer periphery of rod 18 exteriorly of the fluid cylinder 14. The specific form and shape of the grooves and annular rod gripping portions are more particularly set forth in United States Patent 2,643,147 to Funkhouser et al., dated June 23, 1953.

One problem in shock absorbers of the above-described type is that the piston rod is shiftable transversely of the enclosing reservoir cylinder as, for example, when the external shock absorber connections on a vehicle are misaligned. Such transverse movement tends to shift the piston rod radially from a concentric relationship with the encircling seal element so as to impose an unequal transverse thrust thereon. In order to effectively seal shock absorbers where such transverse thrusts occur, it has been found necessary to provide a large number of grooves and annular rod gripping portions on the annular surface of the opening through a seal element such as seal element 40. When such a seal configuration is used, it has been found that the upper rod gripping portions of the seal farthest from cylinder 14 often wear more rapidly than the inner portions. This increased wear is believed to be attributable to the fact that the inner rings or rod gripping portions effectively block the passage of any shock absorber fluid to the interface between the seal element and the piston at the upper part of the seal element, and it is believed that the absence of a thin film of shock absorber fluid increases seal wear to materially lessen sealing efficiency.

Accordingly, one feature of the present invention is means provided in conjunction with the seal element 40 to assure axial or concentric alignment thereof with the piston rod 18. The improved means includes a generally cup-shaped seal element retainer 50 having a base portion 52 and a side wall 54 supportingly engaging the base and radially outermost periphery of the seal element 40, respectively. The side wall 54 of the retainer 50 is spaced radially inwardly from the axially extending wall 44 of guide and closure member 32 and is also spaced below the upper seal cap 20 to thereby allow for relatively substantial free movement of the retainer 50 within the chamber 42 so that the seal element 40 will be continually concentrically arranged in encircling relationship with the piston rod 18. In order to freely float the retainer element within sealing chamber 42, it is supported on a compression spring 55 having one end thereof engaging the upper surface of closure member 32 and the opposite end thereof axially abutting against the base 52 of retainer 50 so as to bias the annular surface of the opening through the seal element 40 against the rod and also hold an upper surface 57 on the element 40 in sealing engagement with the underside of the top seal cap 20 to thereby prevent the entrance of foreign matter into the sealing chamber 42.

Such concentric adjustment of the sealing element 40 on the piston rod 18 makes the grooves 46 and gripping portions 48 more effective. Thus, their number may be materially reduced for a particular shock absorber without affecting satisfactory rod sealing. Where less gripping portions 48 are present, it has been found that a film of shock absorber fluid is present at the interface of each of the gripping portions 48 and the rod 18 for reducing friction and wear therebetween. Hence, the life of the seal structure is materially improved.

Another feature of the seal member 40 is the provision of a somewhat truncated conically-shaped upwardly directed lip 56 that has an annular upper surface 58 thereon inclined outwardly of the outer periphery of the piston rod 18 whereby any fluid present at the uppermost engagement between the seal member 40 and piston rod 18 will be directed radially outwardly from the piston rod by gravitational forces acting thereon. The lip 56 also includes an inner annular surface 60 thereon that diverges radially outwardly of the piston rod 18 to form a space 62 between lip 56 and rod 18 into which the lip 56 can be drawn upon reciprocation of the rod exteriorly of the piston cylinder 14. Thus, upon movement of the rod interiorly of the cylinder upon a compression stroke, the surface 58 on lip 56 will provide a good wiping action so as to remove foreign matter from the rod 18 prior to the time that it passes into frictional engagement with the annular grooves 46 and piston gripping portions 48 on the member 40. Such a wiping action prevents the ingress of dust, moisture or other foreign matter into an abrading relationship with the seal structure.

Furthermore, the seal member 40 includes a groove 64 in the upper surface thereof surrounding the lip 56 at the base thereof with the groove 64, outer surface of lip 56 and seal cap 29 cooperating to form a reservoir 66 spaced radially outwardly and isolated from the outer periphery of the piston rod 18 so as to substantially eliminate corrosion thereof that would otherwise occur during periods where the piston rod 18 is extended partially exteriorly of the cylinder 14, as, for example, when the vehicle is parked for a period of time. This eliminates a source of seal abrasion that may occur upon slight corrosive pitting of a portion of a piston rod intermediate the ends thereof.

It has been found that the provision of a multiple surface seal element of the aforementioned type floated for concentric alignment with a vertically disposed reciprocal rod portion of a direct-acting shock absorber materially improves the operating characteristics and life expectancy of the shock absorber by maintaining a completely effective sealing action for considerable periods of time.

While the embodiments of the present invention as herein disclosed constitute preferred forms, it is to be understood that other forms might be adopted.

What is claimed is as follows:

1. In a shock absorber the combination of cylinder means, a first closure element for sealing the upper end of said cylinder means, a piston rod directed through said first closure member in sliding supported engagement therewith, means enclosing said cylinder means for forming a fluid reservoir therebetween, a second closure element cooperating with said enclosing means for forming a part of the fluid reservoir, said first closure and second closure elements cooperating to form a sealing chamber, a sealing member within said sealing chamber having a plurality of annular rod gripping inner peripheral portions located in sealing engagement with the outer periphery of said piston rod, and means for biasing said sealing member between said first and second closure members to bias said inner peripheral portions thereon into tight sealing engagement with said rod, said sealing member including an elongated upwardly directed lip portion engaging the outer periphery of the piston rod above the upper head of the sealing member at an acute angular relationship with the piston rod, said lip having an inner surface diverging from the piston rod from the free end of the lip, said inner surface and rod forming a space between said lip and rod for receiving a portion of the lip in wiping engagement with the rod upon a first predetermined movement of said rod, said lip serving to wipe foreign matter from the outer periphery of the rod upon movement thereof opposite to said predetermined direction.

2. In a shock absorber the combination of cylinder means, a first closure element for sealing the upper end of said cylinder means, a piston rod directed through said first closure member in sliding supported engagement therewith, means enclosing said cylinder means for forming a fluid reservoir therebetween, a second closure element cooperating with said enclosing means for forming a part of the fluid reservoir, said first closure and second closure elements cooperating to form a sealing chamber, a sealing member within said sealing chamber having a plurality of annular rod gripping inner peripheral portions located in sealing engagement with the outer periphery of said piston rod, means for biasing said sealing member between said first and second closure members to bias said inner peripheral portions thereon into tight sealing engagement with said rod, said member including an elongated upwardly directed lip portion engaging the outer periphery of the piston rod above the upper head of the sealing member at an acute angular relationship with the piston rod, said lip having an inner surface diverging from the piston rod from the free end of the lip, said inner surface and rod forming a space between said lip and rod for receiving a portion of the lip in wiping engagement with the rod upon a first predetermined movement of said rod, said lip serving to wipe foreign matter from the outer periphery of the rod upon movement thereof opposite to said predetermined direction, and means including the outer surface of said lip, the upper head of said sealing member and said second closure member for forming a fluid reservoir isolated from the piston rod to receive fluid directed radially outwardly thereof by the lip portion of said sealing member.

3. In a shock absorber the combination of cylinder means, a closure element for sealing the upper end of said cylinder means, a piston rod directed through said closure member in sliding supported engagement therewith, means enclosing said cylinder means for forming a fluid reservoir therebetween, a closure element cooperating with said enclosing means for forming a part of the fluid reservoir, said first closure and second closure elements cooperating to form a sealing chamber, a sealing element within said sealing chamber having an inner peripheral portion located in sealing engagement with the outer periphery of said piston rod, a seal retainer element having a bottom portion and a side wall supportingly engaging said sealing member, spring means within said chamber for compressing said sealing member between said retainer element and said chamber forming means and radially inwardly, said seal retainer element being spaced a substantial distance from said chamber forming means for floating movement relative thereto, said spring means and seal retainer coacting to freely move said sealing member with respect to a reciprocal rod directed therethrough for producing substantially concentric alignment therebetween, said sealing member including an elongated upwardly directed lip portion engaging the outer periphery of the piston rod above the upper head of the sealing member at an acute angular relationship with the piston rod, said lip having an inner surface diverging from the piston rod from the free end of the lip, said inner surface and rod forming a space between said lip and rod for receiving a portion of the lip in wiping engagement with the rod upon a first predetermined movement of said rod, said lip serving to wipe foreign matter from the outer periphery of the rod upon movement thereof opposite to said predetermined direction.

4. In an encircling rod seal structure for association with a vertically reciprocal rod the combination of, a fixed member including means forming a sealing chamber, a seal element located within said chamber including means forming an axial opening therethrough and a plurality of spaced rod gripping seal portions therein, a seal retainer element having a bottom portion and a side wall supportingly engaging said seal element, spring means within said chamber for compressing said seal element between said retainer element and said chamber forming means and radially inwardly, said seal retainer element being spaced a substantial distance from said chamber forming means for floating movement relative thereto, said spring means and seal retainer coacting to freely move said seal element with respect to a reciprocal rod directed therethrough for producing substantially concentric alignment therebetween, said seal element having an integrally formed annular lip directed therefrom inclding an inclined surface for wiping foreign matter off the exterior of the reciprocable rod upon reciprocation thereof while continuously diverting liquid therefrom.

5. In an encircling rod seal structure for association with a vertically reciprocal piston rod the combination of, a fixed member including means forming a sealing chamber, a seal element located within said chamber including means forming an axial opening therethrough and a plurality of spaced rod gripping seal portions thereon, a seal retainer element having a bottom portion and a side wall supportingly engaging said seal element, spring means within said chamber for compressing said seal element between said retainer element and said chamber forming means and radially inwardly, said seal retainer element being spaced a substantial distance from said chamber forming means for floating movement relative thereto, said spring means and seal retainer coacting to freely move said seal element with respect to a reciprocal rod directed therethrough for producing substantially concentric alignment therebetween, and means including an inclined surface around the axial opening through said seal element for diverting liquid and collecting such liquid at a point spaced from the opening.

References Cited by the Examiner
UNITED STATES PATENTS

| | | |
|---|---|---|
| 2,214,038 | 9/40 | Beecher. |
| 2,793,889 | 5/57 | Potter _____ 277—208 |
| 2,880,022 | 3/59 | Schultze _____ 277—115 |

LEWIS J. LENNY, *Primary Examiner.*

EDWARD V. BENHAM, *Examiner.*